Aug. 16, 1960
C. A. BENOIT
2,949,553
AUTOMATICALLY STARTING SYNCHRONOUS MOTOR
OPERATING AT VARIABLE FREQUENCIES
Filed June 9, 1958
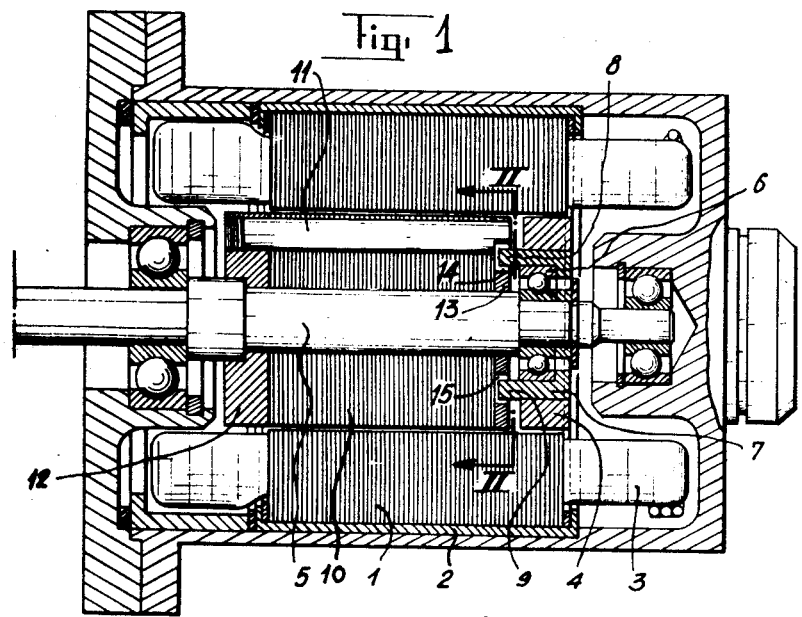
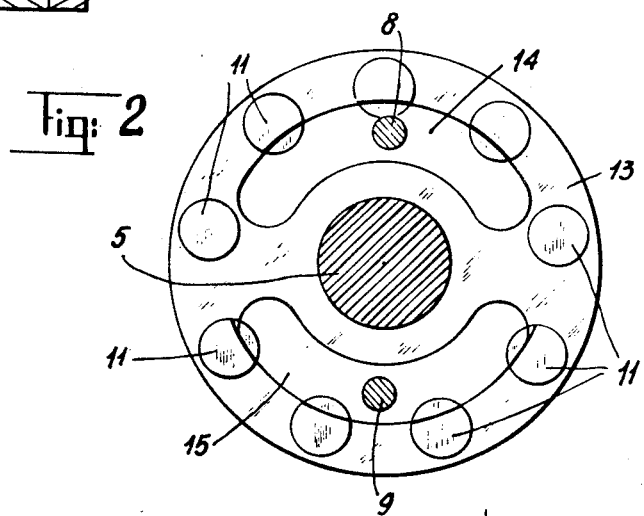
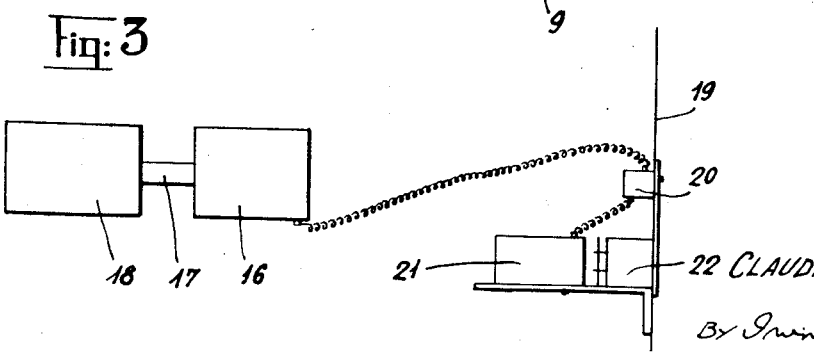
INVENTOR
CLAUDE A. BENOIT
By Irwin S. Thompson
ATTY.

United States Patent Office
2,949,553
Patented Aug. 16, 1960

2,949,553
AUTOMATICALLY STARTING SYNCHRONOUS MOTOR OPERATING AT VARIABLE FREQUENCIES

Claude A. Benoit, Paris, France, assignor to Société STEB, Courbevoie, France, a corporation of France Filed June 9, 1958, Ser. No. 740,828

Claims priority, application France June 20, 1957

3 Claims. (Cl. 310—162)

The present invention has for its object a synchronous motor including a permanent magnet, producing a fractional power and adapted to start automatically under variable frequency conditions.

It is a well known fact that, generally speaking, it is a difficult matter to start and to synchronize synchronous motors. Such synchronous motors may be started through the agency of an auxiliary squirrel cage, for instance, after the manner of asynchronous motors and, once the speed has reached synchronism, direct current is fed into the armature windings so as to obtain synchronization at the desired speed. It may be thought such a starting method is suitable for synchronous motors incorporating a permanent magnet through mere association with said magnet of a squirrel cage serving solely for starting purposes.

Experience has shown that, unless special care is taken, the synchronization of such a motor meets with considerable difficulties, chiefly if the frequency of the feed voltage varies within large limits, as in the case considered by the present invention.

The invention has for its object a synchronous motor incorporating a permanent magnet and including an induction rotor carried by the same shaft as the permanent magnet and an arrangement ensuring a certain angular freedom for said magnet with reference to the induction rotor.

Said arrangement allows obtaining the starting and the synchronization of the motor at the desired synchronous speed for frequencies of the feed voltage varying in a ratio as between 1 and 10.

The invention will be readily understood upon reading of the following description, reference being made to the accompanying drawings, wherein:

Fig. 1 is an axial sectional view of the motor.
Fig. 2 is an elevational view of the driving flange.
Fig. 3 illustrates a particular application of the invention.

In Fig. 1, the motor includes a stator of the type usually incorporated in induction motors, said stator being constituted by a stack of iron sheets 1 held in position inside a casing 2 and by a winding 3 of insulated copper wire, said winding being, for instance, of a three-phase type. A permanent magnet 4 is revolubly fitted to the shaft 5 through the agency of a roller bearing 6. An intermediate member 7 including two diametrically opposed projections 8 and 9 is fitted with a tight fit between the roller bearing 6 and the magnet 4.

An induction rotor which may be of a squirrel cage type is secured to the shaft 5 adjacent the magnet 4. Said rotor includes a stack of iron sheets 10 through which copper bars 11 extend in parallelism with the axis of the rotor, the whole arrangement being rigidly secured by the flanges 12 and 13 made of a conductive material, said flanges closing also the electrically conductive circuit constituted by the copper bars 11.

One of the flanges, say the flange 12, may be made of a comparatively resistant material, so as to give the rotor circuit a sufficient electrical resistance calculated so as to produce, during operation, a torque which is practically independent of the slip within a large range of values of said slip. The flange 13 registering with the magnet is made of copper and includes as more clearly shown in Fig. 2, two arcuate slots 14 and 15 arranged symmetrically with reference to the center of the flange 13. The projections 8 and 9 on the intermediate member 7 fitted inside the magnet 4 and forming a support for the latter engage said slots 14 and 15 so that the magnet may be shifted angularly with reference to the induction rotor.

The starting of the synchronous motor is performed in the following manner: the two sections forming the rotor to wit: the permanent magnet and the actual induction rotor show, under the action of the rotary field produced by the stator, properties which, being of substantially opposed nature, are advantageously associated.

Thus, when the rotary field revolves at a comparatively high speed with reference to the magnet, the latter, by reason of its inertia, is subjected merely to oscillatory movements of a more or less considerable amplitude. In contradistinction, when said relative speed is low, the magnet may be driven in the direction of the field.

On the other hand, the induction rotor produces a torque which varies but little within a large range of values of the speed of the field; but when said relative speed drops underneath a predetermined value, this torque has a tendency to sink speedily.

In the first case of a feed voltage of a high frequency, the rotary field produced by the three-phase winding 3 at the moment at which the starting begins, assumes a comparatively high speed with reference to the magnet 4 and to the induction rotor. The starting is thus obtained under the action of the induction rotor until a speed near synchronism is reached; the magnet 4 will be driven at the beginning through the agency of the flange 13 and of the projections 8 and 9 and it will assume with reference to the induction rotor an oscillatory movement, the frequency of which decreases gradually, while its amplitude increases gradually. When the speed of the rotor is near synchronism, said oscillatory movement reaches an amplitude corresponding to the length of the slot 14 or 15. Experience has shown that these oscillatory movements allow the magnet to act on the flange through the agency of the projections 8 and 9 with more energy in the direction of rotation of the field than in the opposite direction. At a given moment, the action of the magnet will be sufficiently energetic for the movable system to be actually synchronized at synchronous speed and the induction rotor will play no further operative part.

Considering now the case of a field voltage at a comparatively low frequency, say 10 times lower than precedingly, the driving effort of the induction rotor will be very small, while, in contradistinction, the magnet will begin acting a long time before the synchronous speed is reached, so that the motor can start easily.

In an intermediate case, the starting is always obtained through the associated action of the induction rotor and of the magnet, the former being predominant in the case of high frequencies and the latter being predominant in the case of low frequencies.

The association of these opposite properties of the two sections of the rotor allows thus obtaining within a large range of frequencies a speedy starting and synchronization of the motor.

In the case of an embodiment which has proved entirely satisfactory, the starting has been obtained automatically within a range of frequencies extending between 10 cycles and 200 cycles.

Fig. 3 shows the application of the motor described to the remote measuring of a rotary speed. An alternator 16 is driven by the shaft 17 of a turbine 18 of which it is desired to ascertain the speed of rotation. The instrument panel 19 carries a tachometer 20 coupled with the shaft of a motor 21 of the type described, which is fed through the agency of a normally open switch 22. When it is desired to check the speed of the turbine 18, it is sufficient to close the switch 22 and, whatever may be the speed of rotation of the shaft 17 of the turbine 18, the indication of its speed will appear speedily on the dial of the tachometer by reason of the fact that the motor 21 starts automatically whatever may be the frequency feeding it within a very large range of frequencies.

The improved arrangement disclosed may be used on board an air-craft, for instance. In this case, and by reason of the high temperatures which may be reached in the space surrounding said apparatus, it is of advantage, in order to retain the advantageous starting properties of the synchronous motor, to use an alloy having a low temperature coefficient, such as constantan or manganin, for the resistance inserted in the winding of the induction rotor. The tachometer should be substantially non-sensitive with reference to variations in temperature and such a synchronous motor may be associated with a tachometer of the type described in the French patent filed on May 23, 1957, by Société STEB, and entitled "Improvements in Magnetic Driving Means, Chiefly for Tachometers."

The motor disclosed hereinabove has been described solely by way of example and it may be subjected to numerous modifications both in its execution and as concerns its applications, without unduly widening the scope of the invention as defined in the accompanying claims.

Furthermore, and as will be clearly apparent to anyone skilled in the art, the winding of the stator instead of being three-phase may be two-phase or more generally polyphase. In the case of one-phase current, an auxiliary starting phase should obviously be provided. The induction rotor instead of being of the squirrel cage type may include a normal winding in which a suitable resistance is inserted. The magnet includes a number of poles corresponding to that of the stator poles and its angular freedom with reference to the induction rotor depends on the number of poles of the permanent magnet and on the range of frequencies used.

Similarly, the motor forming the object of the invention is of interest for all applications in which it is desired to obtain a comparatively low power at a predetermined speed, said speed being advantageously adjusted within a very broad range through a modification of the frequency of the field voltage. It is possible to mention in particular the application to speed and the like regulating means, electric clocks, motors driving magnetophones and talking machines and the like.

What I claim is:

1. A synchronous motor comprising a stator fed with A.C., a compound rotor assembly including a shaft, a squirrel cage induction rotor rigid with said shaft and including an annular series of conductive bars to provide conductive paths, a resistant flange completing the paths of the cage formed by the bars at one end of said cage, the resistance of said flange determining the torque characteristic of the induction rotor, and a conductive flange provided with at least one annular slot coaxial with the shaft and completing said paths at the other end of the cage, a roller bearing fitted on the shaft and including coaxial races, a support rigid with the outer race of the roller bearing and including a projection extending in parallelism with the shaft and permanently engaging the corresponding slot in the flange of the induction rotor to ensure a driving connection between said support and the induction rotor in either direction with an angular clearance therebetween, and a permanent magnet rigidly secured to said support.

2. A synchronous motor comprising a stator fed with A.C., a compound rotor assembly including a shaft, a squirrel cage induction rotor rigid with said shaft and including an annular series of conductive bars to provide conductive paths, a resistant flange made of material having a low temperature coefficient completing the paths of the cage formed by the bars at one end of said cage, the resistance of said flange determining the torque characteristic of the induction rotor, and a conductive flange provided with at least one annular slot coaxial with the shaft and closing said paths at the other end of the cage, a roller bearing fitted on the shaft and including coaxial races, a support rigid with the outer race of the roller bearing and including a projection extending in parallelism with the shaft and permanently engaging the corresponding slot in the flange of the induction rotor to ensure a driving connection between the said support and the induction rotor in either direction with an angular clearance therebetween, and a permanent magnet rigidly secured to said support.

3. A synchronous motor according to claim 2 in which said conductive flange has a plurality of annular slots coaxial with said shaft, and said support includes a plurality of diametrically opposed projections extending in parallelism with said shaft and permanently engaging the corresponding slots.

References Cited in the file of this patent

UNITED STATES PATENTS

| | | |
|---|---|---|
| 1,977,966 | Knobel | Oct. 23, 1934 |
| 2,072,894 | Lilja | Mar. 9, 1937 |
| 2,704,343 | Streuber et al. | Mar. 15, 1955 |
| 2,725,494 | Anderson | Nov. 29, 1955 |
| 2,784,331 | Rodemann | Mar. 5, 1957 |
| 2,810,085 | Akeley | Oct. 15, 1957 |

FOREIGN PATENTS

| | | |
|---|---|---|
| 574,764 | France | Apr. 4, 1924 |